(12) United States Patent
Cookman et al.

(10) Patent No.: US 8,135,058 B2
(45) Date of Patent: Mar. 13, 2012

(54) ADAPTIVE KNOWN SIGNAL CANCELLER

(75) Inventors: Jordan Christopher Cookman, San Jose, CA (US); Ping Dong, Cupertino, CA (US); Tao Yu, Milpitas, CA (US)

(73) Assignee: CSR Technology Inc., San Jose, CA (US)

( * ) Notice: Subject to any disclaimer, the term of this patent is extended or adjusted under 35 U.S.C. 154(b) by 688 days.

(21) Appl. No.: 12/249,814

(22) Filed: Oct. 10, 2008

(65) Prior Publication Data
US 2010/0091822 A1 Apr. 15, 2010

(51) Int. Cl.
*H04L 27/01* (2006.01)
*H04B 3/20* (2006.01)

(52) U.S. Cl. ........................ 375/232; 370/292

(58) Field of Classification Search .......... 375/229–232, 375/350; 370/286, 290, 292
See application file for complete search history.

(56) References Cited

U.S. PATENT DOCUMENTS

| | | | |
|---|---|---|---|
| 4,987,569 A * | 1/1991 | Ling et al. ................. | 370/292 |
| 5,095,497 A * | 3/1992 | Aman et al. ................ | 375/254 |
| 5,475,632 A | 12/1995 | Sugiyama | |
| 5,642,379 A * | 6/1997 | Bremer ..................... | 375/216 |
| 5,742,591 A | 4/1998 | Himayat et al. | |
| 6,101,215 A | 8/2000 | Takeda et al. | |
| 6,308,562 B1 | 10/2001 | Abdallah et al. | |
| 6,563,863 B1 * | 5/2003 | Read ....................... | 375/222 |
| 6,570,912 B1 | 5/2003 | Mirfakhraei | |
| 6,654,412 B1 * | 11/2003 | Chen et al. ................ | 375/232 |
| 6,914,934 B1 | 7/2005 | Lou et al. | |
| 6,965,578 B1 * | 11/2005 | Kappes ..................... | 370/286 |
| 7,133,442 B2 * | 11/2006 | Hamdi ...................... | 375/222 |
| 7,599,432 B2 * | 10/2009 | Pessoa et al. .............. | 375/232 |
| 2001/0036228 A1 | 11/2001 | Skafidas et al. | |
| 2003/0099208 A1 * | 5/2003 | Graziano et al. ............ | 370/286 |
| 2004/0136442 A1 | 7/2004 | Laurent | |
| 2005/0185745 A1 | 8/2005 | Karr | |
| 2007/0121717 A1 | 5/2007 | Dong et al. | |
| 2008/0025424 A1 | 1/2008 | Yang | |
| 2008/0225174 A1 | 9/2008 | Greggain et al. | |

OTHER PUBLICATIONS

Lin et al., "Semi-random Construction of Quasi-Cyclic LDPC Codes", 2005 International Conference on communications, Circuits and Systems: proceedings vol. 1, May 27-30, 2005, pp. 9-13.
International Search Report and the Written Opinion issued for PCT/US2009/060152, dated Nov. 18, 2009, 9 pages.
Song, et al., On Channel Estimation and Equalization in TDS-OFDM based Terrestrial HDTV Broadcasting SYstem, IEEE Transactions on Consumer Electronics, vol. 51, No. 3, Aug. 2005, pp. 790-797.
Hayes, H., Statistical Digital Signal Processing and Modeling, John Wiley & Sons, Inc., 1996, pp. 1.
GB 20600-2006, Framing Structure, Channel Coding and Modulation for Digital Television Terrestrial Broadcasting System, Aug. 2006, pp. 1-138.

* cited by examiner

*Primary Examiner* — Khanh C Tran
(74) *Attorney, Agent, or Firm* — Fulbright & Jaworski L.L.P.

(57) ABSTRACT

An adaptive known signal canceller comprising of a known signal canceller filter responsive to a known signal including a known portion of a transmitted signal, the known signal canceller filter operative to generate a filtered known signal, and a subtractor unit responsive to an input signal and operative to generate an output signal, the subtractor unit configured to subtract the filtered known signal from the input signal to generate an output signal, such that the known portion of the transmitted signal is substantially removed from the input signal. The adaptive known signal canceller further comprising of a known signal canceller update unit, responsive to a desired signal and an output signal and operative to continually adjust the coefficients of the known signal canceller filter based on the difference between the output signal and the desired signal, so that the filter coefficients substantially reflect the impulse response of a channel.

48 Claims, 4 Drawing Sheets

ADAPTIVE KNOWN SIGNAL CANCELLER

FIELD OF THE INVENTION

The present invention relates generally to digital communication systems, and more particularly to a receiver including an adaptive known signal canceller.

DESCRIPTION OF THE PRIOR ART

The field of digital communication has grown significantly in the last decade due to recent advantages in wideband communication channels and solid-state electronics. Digital communication describes the transmission of a sequence of digital messages or a digitized analog signal.

Digital communication signals are used to send digital data from a transmitter to a receiver. The signals may be transmitted using wireless or wired media. The data may represent any type of information, such as text, sound, images, or computer files. Such information, which is unknown to the receiver until it has received and decoded the data, is defined herein as the "unknown portion" of the communication signal.

Communication signals are typically impaired by a channel before arriving at a receiver's input. In wireless systems, the signals often arrive at the receiver via multiple paths. This type of channel impairment is known as "multipath." Due to the varying delays and attenuations among the multiple paths, the signals may add constructively or destructively. When the signals add destructively, it is commonly known as "fading," as the combined signal becomes attenuated, or "fades." Depending on the bandwidth of the signals and the delays of the multiple paths, different frequency components of the signal may experience different levels of fading. This is known as "frequency-selective" fading. The multiple signals arriving at a receiver are often described relative to a "main" or strongest path, combined with "echoes" or weaker paths. In broadcast television, the echoes are known as "ghosts" due to the perceived effect of multipath on analog TV signals. The delay between the earliest arriving path and the latest arriving path at the receiver is commonly referred to as the "delay spread" of the channel.

A typical digital communication system uses a sinusoidal carrier, whose amplitude and/or phase are modulated in order to communicate information. Although the nominal carrier frequency is known to both the transmitter and receiver, there is typically a frequency offset between the carrier generated by the transmitter and a locally generated carrier signal in the receiver. Therefore, a mechanism is typically provided in the receiver to recover the precise frequency and phase of the carrier generated by the transmitter. Such mechanisms are known as carrier recovery.

In a typical communication system, signals are transmitted according to a specified time base. Although the nominal time base is known to both transmitter and receiver, there is typically a timing offset between the time base used by the transmitter and the local time base in the receiver. Therefore, a mechanism is typically provided in the receiver to recover the precise timing of the transmitted signal. Such mechanisms are known as timing recovery.

To aid the receiver, many communication signals also include pre-defined signals, such as synchronization or framing signals. The receiver can be designed to utilize these signals for various purposes, including carrier recovery, timing recovery, frame alignment, and channel estimation. Such signals are defined herein as the known portion of the communication signal.

One digital communication system that defines such a known portion for its signal is the standard GB20600-2006 system (used for digital terrestrial television broadcast in China), also known as Digital Television Multimedia Broadcast (DTMB). It defines three different header modes, each using a pseudo-random number (PN) sequence to generate a known header signal for each transmitted frame. In one mode, the unknown portion of the signal is transmitted using orthogonal frequency domain modulation (OFDM) techniques. In that mode, the known PN sequence constitutes the guard interval (GI) of the OFDM frame, and is an alternative to the cyclic prefix (CP) typically used in OFDM systems such as digital video broadcasting-terrestrial (DVB-T) used for digital television broadcasting in other parts of the world. The CP is a repeated portion of the unknown signal, so unlike the PN sequence used in DTMB, the receiver does not know it in advance.

In most DTMB receivers, the known PN sequences are used for channel estimation. Unlike most CP-based OFDM systems, the DTMB system does not include frequency domain pilot signals that can be used for channel estimation.

A conventional DTMB receiver includes a channel estimation block. The channel estimation block uses PN sequence correlation techniques to estimate the channel impulse response. The conventional DTMB receiver further includes an OFDM symbol restoration block, which performs two functions: 1) to remove the PN sequence from the guard interval, and 2) restoration of the channel spread OFDM symbols.

Conventional approaches to channel estimation using PN correlation are preconditioned on a cyclic form of the PN sequence. Therefore, this approach is not applicable for non-cyclic PN sequences (such as PN595 used in DTMB header mode 2). Further, such an approach is undesirable for cyclic (or quasi-cyclic) PN sequences, as channel estimation using PN correlation is quite complex when the channel delay spread is longer than the cyclic PN period. Although, an iterative interference cancellation technique has been developed to handle long channel delay spreads, this technique is impractical, as it is prohibitively expensive to implement in a consumer-grade digital TV receiver.

PN correlation-based channel estimation and known PN signal cancellation also have the disadvantage of only being updated at most once per frame. Consequently, when the channel characteristics are changed within a frame, known PN signal cancellation performance is undesirably degraded.

An adaptive noise cancellation is commonly used to remove noise from a signal, and is known to one skilled in the art. However, adaptive noise cancellation can be applied in a novel and unconventional way to known signal cancellation and channel estimation. In such an unconventional application, the output signal is used to update the coefficients of the adaptive filter, using well-known techniques like Least Mean Squares (LMS). In the LMS technique, coefficient updates are done once for every discrete time filter output, and therefore can be performed more than once per frame. In the unconventional application of noise cancellation, the known portion of the signal is treated like "noise" and the coefficients of the adaptive noise canceller represent the channel impulse response for the noise-cancelled signal.

Thus, the need arises for a receiver which includes an adaptive known signal canceller having channel estimation capability that is done inexpensively and with higher accuracy.

BRIEF SUMMARY OF THE INVENTION

Briefly, an adaptive known signal canceller adaptive for use in a receiver configured to receive at least one channel carrying information. The adaptive known canceller comprising of a known signal canceller filter responsive to a known signal including a known portion of a transmitted signal, the known signal canceller filter operative to generate a filtered known signal. The adaptive known canceller further comprising of a subtractor unit responsive to an input signal and operative to generate an output signal, the subtractor unit configured to subtract the filtered known signal from the input signal to generate an output signal, such that the known portion of the transmitted signal is substantially removed from the input signal. The adaptive known signal canceller further comprising of a known signal canceller update unit, responsive to a desired signal and an output signal and operative to continually adjust the coefficients of the known signal canceller filter based on the difference between the output signal and the desired signal, so that the filter coefficients substantially reflect the impulse response of a channel.

The foregoing and other objects, features and advantages of the present invention will be apparent from the following detailed description of the preferred embodiments which make reference to several figures of the drawing.

DETAILED DESCRIPTION

To overcome the limitations in the prior art described above, and to overcome other limitations that will become apparent upon reading and understanding the present specification, the present invention discloses a known signal canceller for canceling a known part of a transmitted signal, while simultaneously estimating the impulse response of a transmission channel, thereby eliminating the need for a separate channel estimation block.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

As will be evident with the figures and description to follow, a receiver is disclosed to include an adaptive known signal canceller, which combines the functions of known signal cancellation and channel estimation and that performs channel estimation using either cyclic or non-cyclic known signals. Further, the canceller is a fully adaptive known signal canceller that continually updates to provide optimal canceling. In one embodiment of the present invention, the canceller advantageously updates channel estimation more than once per frame.

Figure 1:
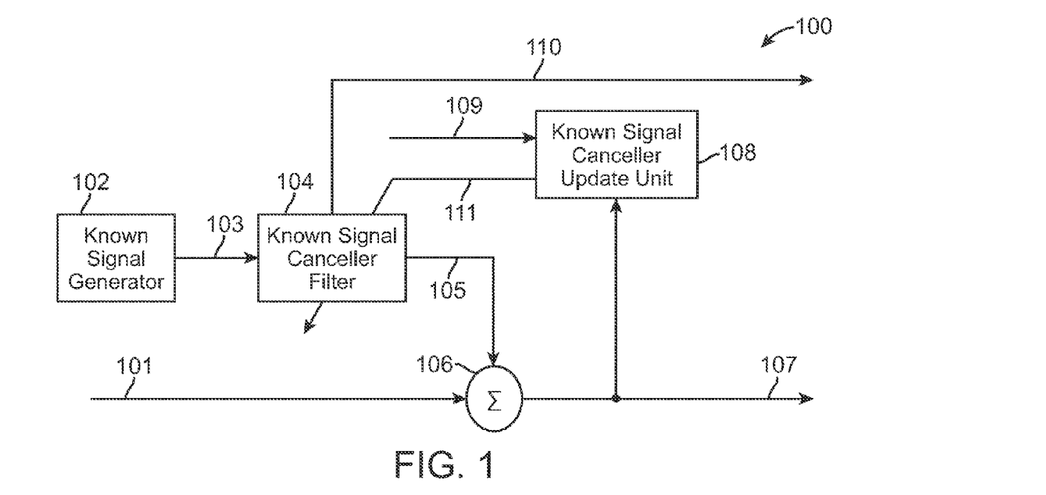
FIG. 1 shows an adaptive known signal canceller 100.

FIG. 1 shows an adaptive known signal canceller 100, in accordance with an embodiment of the present invention. The canceller 100 is generally a part of a receiver. In the exemplary embodiment of the present invention shown in FIG. 1 carrier recovery is not necessary, or carrier recovery has been performed prior to adaptive known signal cancellation. Canceller 100 is responsive to an input signal 101 that is a distorted representation of a transmitted signal. Canceller 100 is shown to receive input signal 101, the desired signal 109 and to generate an output signal 107 and an estimated channel impulse response 110. The desired signal 109 represents the desired output signal with the known signal part having been removed. The canceller 100 is shown to include a known signal generator block 102, known signal canceller filter block 104, signal subtractor block 106, and a known signal canceller update unit 108, in accordance with an embodiment of the present invention.

The generator 102 is shown to generate the known signal 103, which serves as input to the filter 104. The block 104, which is an adaptive filter whose coefficients are updated by the output of the unit 108, generates a filtered known signal 105, which is fed to the block 106. The coefficients reside in block 104 and are updated by coefficient updates sent from 108. Unit 108 is operative to generate coefficient update signal 111. Signal 111 serves to update the coefficients of block 104. In an alternative embodiment of the present invention, unit 108 is operative to generate error value 111. In this alternative embodiment, error value 111 is one or more errors, which are provided to block 104 for updating the coefficients. In this embodiment, error value 111 is essentially a difference signal representing the difference between the output signal 107 and the desired signal 109. The block 106 also receives the input signal 101 and generates the output signal 107. The output signal 107 is provided as input to the unit 108. The unit 108 also receives as input the desired signal 109. Unit 108 generates signal coefficient adjustment signal 111 to filter 104.

Accordingly, the generator 102 is shown coupled to the filter 104 and the filter is shown coupled to the block 106 and to the unit 108. The block 106 is also shown coupled to the unit 108.

Input signal 101 is received by the canceller 100 from a transmitter. In an embodiment of the present invention, input signal 101 suffers from impairments by a channel. Such impairments include, but are not limited to, the effects of multipath and frequency selective fading. In another embodiment of the present invention, input signal 101 may have undergone processing by other receiver blocks, such as an automatic gain control (AGC) block, carrier recovery block, and timing recovery block.

By way of brief background, in the DTMB system, generally, every frame includes a pre-defined PN sequence and a system information sequence. The receiver can use the entire PN sequence as the known portion of the signal. Alternatively, the receiver can use only a part of the PN sequence as the known portion of the signal. The system information sequence is unknown to the receiver when it begins operating, but after an initial detection period, the system information sequence is identified and "known". Therefore, after the initial detection period, the known portion of the signal can be lengthened in the receiver, such that the known portion of the signal includes both PN and system information sequences.

Known signal generator block 102 is operative to generate the known signal 103, and is coupled to the known signal canceller filter 104. The known signal 103 includes a known portion of the original transmit signal, which is known in advance by both the transmitter (not shown) and the receiver of which the canceller 100 is a part thereof.

In contrast, an unknown portion of the original transmit signal, the unknown signal, is only known by the transmitter, and represents information to be communicated to the receiver. (The known signal need not be identical to the predefined portion of the transmitted signal.)

The known signal 103 consists of periods of known portions of the original transmit signal and periods of no signal or null signal. Block 102 is operative to generate the known portion of the original transmitted signal (transmitted by the transmitter), which is the known signal 103 for use when processing portions of the input signal 101 corresponding to the known portion of the original transmit signal. Block 102 is further operative to generate no signal or a null signal for use when processing portions of the input signal corresponding to the unknown portion of the original transmit signal. The resulting signal is known signal 103, which consists of periods of known portions of the original transmit signal and periods of no signal or null signal.

The block 104 is operative to generate the filtered known signal 105 and the estimated channel impulse response 110. The signal 105 is representative of the known signal 103 after impairment by a communication channel, such as a multipath channel. The signal 110 is representative of the response of a communication channel to an impulse, and generally consists of a set of discrete time values or coefficients. The output of block 104, or coefficients, is the estimated impulse response of the channel 110. As will be shortly described, the coefficients of the block 104 are continually adapted to track the impulse response of the channel since the delay and attenuation of the multiple paths may change over time, particularly when the receiver is moving relative to the transmitter. Block 104 provides an input signal 105 to signal subtractor block 106. Block 104 is coupled to known signal canceller update unit 108, known signal generator 102, and signal subtractor block 106.

The known signal 103 and the input signal 101 have substantially the same time base. That is, they are generated at substantially the same symbol rate. In one embodiment, the known signal 103 has the same time base as the original transmitted signal and the input signal 101 has already been processed by the receiver's timing recovery in order to synchronize it to the transmitter. In other embodiments, the known signal generator 102 includes a timing recovery process that synchronizes the known signal 103 to the local receiver's time base. Other system architectures are contemplated where the transmitter and receiver are externally synchronized, and no timing recovery is necessary in the receiver.

In operation, the block 104 receives the known signal 103 and generates the filtered known signal 105. In one embodiment, the block 104 is a finite impulse response (FIR) digital filter, which is readily known to those skilled in the art. Other embodiments are contemplated wherein the block 104 is an infinite impulse response (IIR) filter (also known to those skilled in the art), a non-linear filter, or in general any type of filter. Note that while the known signal 103 conceptually includes periods of null signal, the null signal need not physically be generated in the receiver. Instead, the known signal generator 102 and the block 104 may be synchronized in such a way that the block 104 operates as if the null signal were present when processing portions of the input signal 101 corresponds to the unknown portion of the original transmit signal. This can be done for example by using only a subset of filter coefficients when calculating the filter output, leaving out the coefficients corresponding to unknown portions of the original transmit signal. Note also that in the DTMB example, the PN sequence can be represented using only values of −1 and +1. This can greatly simplify the design of the known signal canceller filter. For example, if an FIR filter is used, it can be implemented using only addition and subtraction functions with no multiplication function, which is expensive to implement, necessary.

In some cases, the known signal has several repetitions of a PN sequence, and is defined herein as a "cyclic" PN. It is noted that the PN sequences in DTMB header modes 1 and 3 are actually "quasi-cyclic," meaning only a part of the PN sequence is repeated.

The signal subtractor 106 receives the input signal 101 and the filtered known signal 105. The signal subtractor 106 subtracts the filtered known signal 105 from the input signal 101 to generate an output signal 107.

A known signal canceller update unit 108 adjusts the coefficients of the block 104 based on a comparison of the output signal 107 to a desired signal 109 wherein the desired signal 109 is typically an all-zero or null signal. Unit 108 is responsive to signal 107 and signal 109 and operative to send coefficient adjustment signal 111 to known signal canceller filter 104. Signal 111 contains the coefficient adjustments based on the comparison of signal 107 with signal 109. In one embodiment, the coefficient adjustment is done using the LMS algorithm and the coefficients are adjusted once for every discrete time value of the input signal 101. Note that due to the presence of the null signal or no signal during portions of the known signal, the adjustment computed by the LMS algorithm for some coefficients will be 0, effectively resulting in no adjustment. In some embodiments, the adjustment is disabled for those coefficients when the corresponding known signal 103 is null or not present. Other embodiments use the Recursive Least Squares (RLS) method as an alternative to the LMS algorithm to update the coefficients.

Once converged, the coefficients of the block 104 represent the estimated impulse response of the channel 110 and the output signal 107 includes only the unknown signal. The coefficients are continually adapted to track the impulse response of the channel since the delay and attenuation of the multiple paths may change over time, particularly when the receiver is moving relative to the transmitter.

In some receiver designs, the input signal 101 may have a carrier frequency offset relative to the known signal 103. This indicates that carrier recovery has not been done yet or has only partially been done. In this case, the block 104 of FIG. 1 adjusts to compensate both for the changes in the channel impulse response as well as for the changes in the carrier phase. However, this reduces the effectiveness of the block 104 in estimating the channel impulse response. Therefore, it is desirable to implement a separate carrier recovery mechanism such that the carrier frequency offset is removed or eliminated before the signal subtractor 106.

Block 104 may suffer from self-noise, due to the large number of taps required to handle channel delay spreads near the guard interval length. To reduce self-noise, block 104 can be segmented in a manner similar to the segmented equalizer shown and discussed in U.S. patent application Ser. No. 11/291,334, entitled "Segmented Equalizer," filed Nov. 30, 2005, by Dong et al., all of which is incorporated herein by reference as though set forth in full. Using this approach, the block 104 is divided into segments with each segment having its own step size for coefficient updating. Segments with smaller coefficients use a smaller step size, greatly reducing the contribution of those segments to the self-noise of the block 104.

As previously noted, in an exemplary embodiment of the present invention, known signal canceller filter 104 is a finite impulse response (FIR) filter. A FIR filter generally includes a plurality of coefficients wherein each coefficient is responsive to a delayed sample. The delayed samples are dispersed between the coefficients where each delayed sample corresponds to a coefficient. There is no feedback path in a FIR filter. An adaptive FIR filter further includes a step size used for updating the coefficients. In one embodiment of the present invention, the FIR filter is segmented. In an adaptive FIR filter that is segmented, each segment has its own step size, whereas in a non-segmented adaptive FIR filter, there is generally only one step size for all coefficients. In another embodiment of the present invention, the FIR filter is not segmented.

FIG. 1 further shows a signal subtractor 106, which is operative to subtract the filtered known signal 105 from the input signal 101, and to generate an output signal 107. Output signal 107 represents the unknown portion of the received signal, with the known portion of the received signal substantially removed. Note that due to imperfections in the estimated channel impulse response, the known portion of the signal may not be completely removed. For example, the known portion may only be attenuated relative to the unknown portion.

Figure 2:
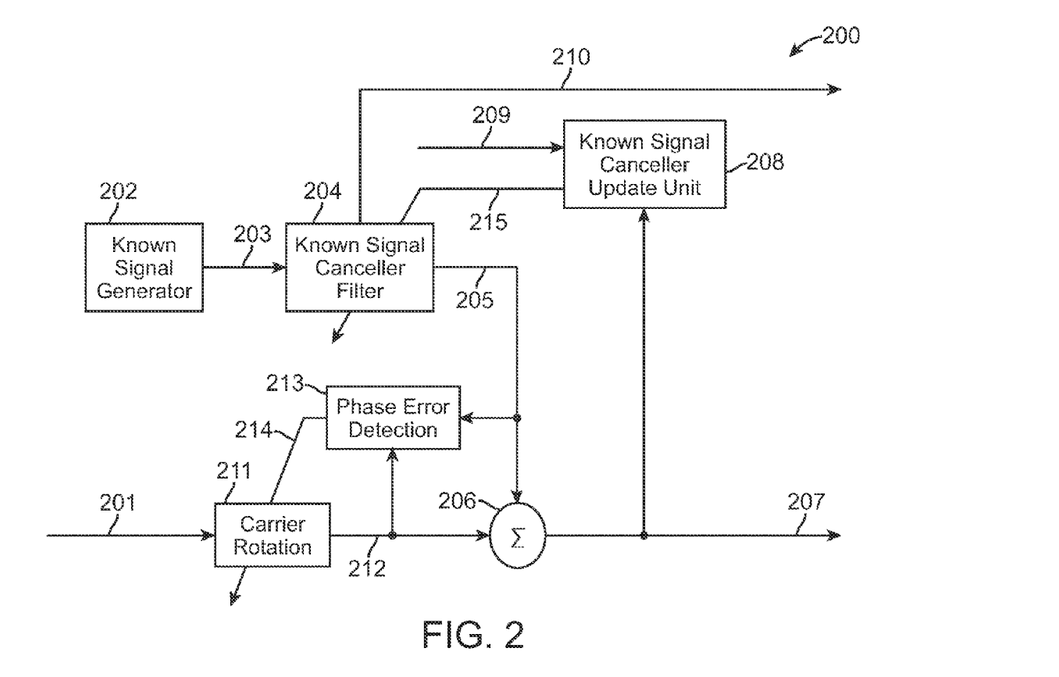
FIG. 2 shows an adaptive known signal canceller 200 wherein the filtered known signal 205 is used for carrier recovery.

FIG. 2 shows an adaptive known signal canceller 200, in accordance with an alternative embodiment. In the canceller 200, the filtered known signal is used for carrier recovery. In this embodiment, the canceller 200 receives an input signal 201. A known signal generator 202 generates a known signal 203. Input signal 201 is substantially the same as input signal 101 of FIG. 1, known signal generator 202 is substantially the same as known signal generator 102 of FIG. 1, and known signal 203 is substantially the same as known signal 103 of FIG. 1. However, the embodiment of FIG. 2 is configured to better handle the case where there is a carrier frequency offset between the input signal 201 and the known signal 203.

A known signal canceller filter block 204 receives the known signal 203 and generates a filtered known signal 205. The block 204 is substantially the same as block 104 of FIG. 1, except that its coefficients may be different. Filtered known signal 205 differs from filtered known signal 105 of FIG. 1 in that the latter may include a carrier rotation to compensate a carrier offset between the input signal 101 and the known signal 103.

In FIG. 2, an adaptive known signal canceller 200 is shown wherein the filtered known signal 205 is used for carrier recovery. In known signal canceller 200 the carrier recovery mechanism is advantageously implemented to remove the carrier frequency offset before the signal 205 is used by signal subtractor 206. Canceller 200 is advantageously designed for instances when there is a carrier frequency offset between the input signal 201 and the known signal 203.

Canceller 200 is shown to receive the input signal 201 and to generate the signal 210 and the output signal 207. The known signal canceller filter 204 is shown to generate the estimated channel impulse response 210 and the filtered known signal 205. The known signal generator 202 is shown to generate a known signal 203. The phase error detection 213 is shown to generate the phase error signal 214. A carrier rotation block 211 is shown to generate the rotated input signal 212 and the signal subtractor 206 is shown to generate the output signal 207.

The canceller 200 is shown to include a known signal generator block 202, a known signal canceller block 204, a subtractor block 206, a known signal canceller update unit 208, a carrier rotation block 211, and a phase error detection block 213.

Input signal 201, known signal generator block 202, known signal 203, known signal canceller block 204, filtered known signal 205, subtractor block 206, output signal 207, known signal canceller update unit 208, desired signal 209, estimated channel impulse response 210, coefficient adjustment signal 215 are analogous to input signal 101, known signal generator block 102, known signal 103, known signal canceller block 104, filtered known signal 105, subtractor block 106, output signal 107, known signal canceller update unit 108, desired signal 109, estimated channel impulse response 110, and coefficient adjustment signal 111 in FIG. 1, respectively.

In FIG. 2, the carrier rotation block 211 is shown coupled to the phase error detection block 213 and to the signal subtractor 206. The carrier rotation block 211 is operative to receive input signal 201 and to generate a rotated input signal 212. Rotated input signal 212 is representative of the input signal after rotation by a carrier phase. For example, if the input signal 201 is a complex baseband signal expressed as I+j*Q, the rotated input signal 212 can be expressed as (I+j*Q)*exp(j*theta), where theta is the angle of rotation, j is the square root of −1, and exp(j*theta)=cos(theta)+j*sin(theta). Signal subtractor 206 is shown coupled to the carrier rotation block 211 and the known signal canceller filter block 204. Subtractor 206 receives the rotated input signal 212 and the filtered known signal 205, and is operative to subtract the filtered known signal 205 from the rotated input signal 212, to generate output signal 207. Phase error detector block 213 is shown coupled to the carrier rotation block 211 and to the subtractor 206. Phase error detector block 213 is operative to receive both the filtered known signal 205 and the rotated input signal 212, and detect the phase error between the signals 205 and 212. It is noted that the phase error estimate is only reliable during portions of the filtered known signal 205 corresponding to known portions of the original transmit signal.

In an embodiment of the present invention, the phase error estimate is only used when the power or absolute value of the filtered known signal 205 is above a threshold.

The phase error detection block 213 generates a phase error signal 214 used by the carrier rotation block 211. The carrier rotation block 211 uses the phase error signal 214 to update the frequency and/or phase of the rotation applied to the input signal 201. In an exemplary embodiment of the present invention, the carrier rotation block 213 performs a second order phase looked loop (PLL) to track both phase and frequency of the carrier.

Known signal canceller update unit 208 is shown coupled to the known signal canceller filter block 204 and to the subtractor 206. Unit 208 is operative to adjust the coefficients of the known canceller filter block 204, based on a comparison of the output signal 207 with desired signal 209. Unit 208 is responsive to signal 207 and signal 209 and operative to send coefficient adjustment signal 215 to known signal canceller filter 204. Signal 215 contains the coefficient adjustments based on the comparison of signal 207 with signal 209.

Once converged, the coefficients of the known signal canceller filter block 204 represent the estimated impulse response of the channel 210, and the output signal 207 contains only the unknown signal. Estimated channel impulse response 210 differs from estimated channel impulse response 110 of FIG. 1 in that the latter includes the effect of carrier offset between the input signal 101 and the known signal 105. As with the block 108, the block 208 uses the LMS algorithm in an embodiment of the present invention. Other embodiments use Recursive Least Squares (RLS) as an alternative to the LMS method or other alternative adaptation methods to update the coefficients.

Figure 2A:
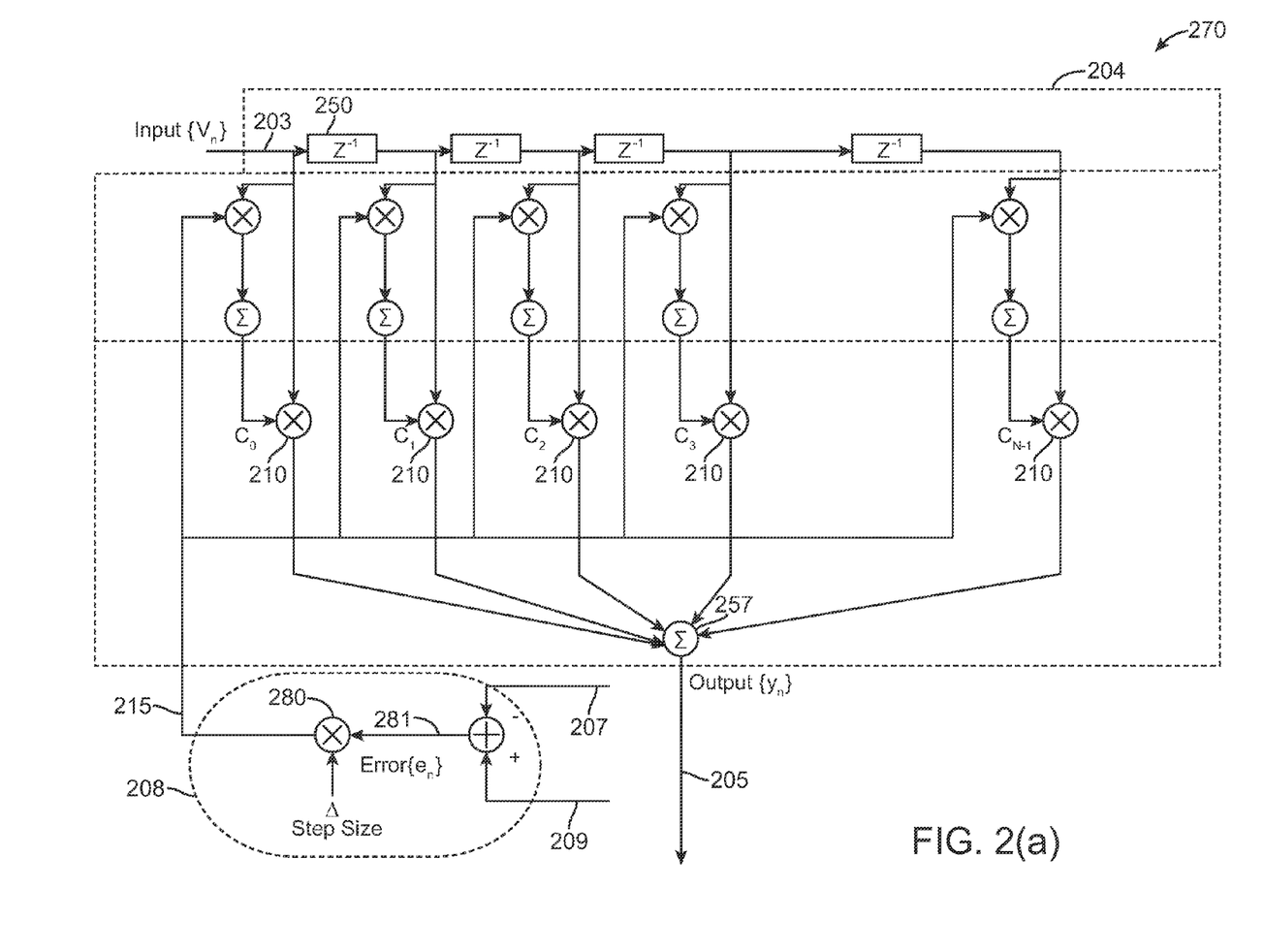
FIG. 2(a) shows a block diagram of an embodiment of known signal canceller filter block 204.

FIG. 2(a) shows an exemplary embodiment of a known signal canceller update and filter block 270. Block 270 is shown to include known signal canceller update unit 208 and known signal canceller filter 204. It is noted that in an alternative embodiment of the present invention block 270 is implemented in software. Block 270 is shown to receive as input known signal 203, and is operative to generate as output filtered known signal 205. Known signal canceller filter 204 is shown to receive signal 203 or an known signal sample sequence $\{v_n\}$, create multiply delayed versions of the known signal samples by delay elements 250, then multiply these multiply delayed known signal samples by a estimated channel impulse response 210 also known as filter coefficients $c_0, \ldots, C_{N-1}$, where N is filter length. The results are then summed together, by a summer 257, to form a filtered known signal 205 or a filter output sequence $\{y_n\}$. This is shown in the following Filter Equation:

$$y_n = \sum_{i=0}^{N-1} v_{n-i} c_i \qquad \text{Eq. (1)}$$

Known signal canceller update unit 208 is shown to receive output signal 207 and desired signal 209. Unit 208 then uses signal 207 and signal 209 to produce signal 281 also known as the error sequence $\{e_n\}$ according to Error Equation:

$$e_n = d_n - y_n \qquad \text{Eq. (2)}$$

The signal 281 or the error is further scaled by a step size multiplier 280 to form scaled error 215. The coefficients of the filter are then updated by signal 215 using the scaled error and delay line data (from the delay line block 250) according to the Update Equation:

$$c_i^{k-1} = c_i^k + \Delta e_n v_{n-i}, \, i=0, \ldots, N-1 \qquad \text{Eq. (3)}$$

Where $v_{n-i}$'s are delay line signal samples, $e_n$ is the error, and $\Delta$ is the step size for coefficients update. $c_i^k$'s (same as $c_i$'s) and $c_i^{k+1}$'s are current set and next set of equalizer coefficients.

It is noted that filter block 204 is generally made of a series of taps (or delay elements) coupled to sequentially delay the input by a sample each and a series of corresponding multipliers for multiplying the output of the delay elements with respective coefficients that are updated pursuant to an algorithm, such as the LMS or the RLS algorithm. Block 204 is responsive to the input of known signal 203. Known signal 203 can be real or complex valued. In one embodiment of the present invention, the input values are restricted to the values of −1, 0, or +1. Therefore, in this embodiment of the present invention, multiplication can be implemented by simple operations like sign inversion, without requiring expensive multipliers. Accordingly, the multiplier hardware is simplified when the input values and/or coefficients are restricted to a limited number of values. The portion of the known signal 203 corresponding to the known portion of the transmit signal is limited to values of −1 or +1, while the part of "known signal" corresponding to the unknown part of the transmit signal is equal to 0. The filter operation consists of adding and subtracting filter coefficients. The "multiplication" carried out by the multipliers of block 204 is therefore very simple, and consists of selecting whether to add, subtract, or to perform no operation at all. The simple operations carried out by the multipliers of block 204 advantageously reduces the cost associated with the production of block 204.

In yet another embodiment of the present invention, the multipliers of block 204 are implemented using add and shift elements. Such an embodiment has the drawback of more complex multiplier hardware.

In an exemplary embodiment of the present invention, block 204 includes n number of delay tap elements, and n number of multiplier blocks. The n number of delay tap elements and multiplier blocks is determined by the desired accuracy of canceller 200, in particular the desired maximum channel delay spread that can be handled.

It is noted that known signal canceller filter block 104 is analogous to known signal canceller filter block 204 of FIG. 2(a). It is further noted that signal 215, signal 210, and signal 203 are analogous to signals 111, 110, and 103 of FIG. 1, respectively.

Figure 3:
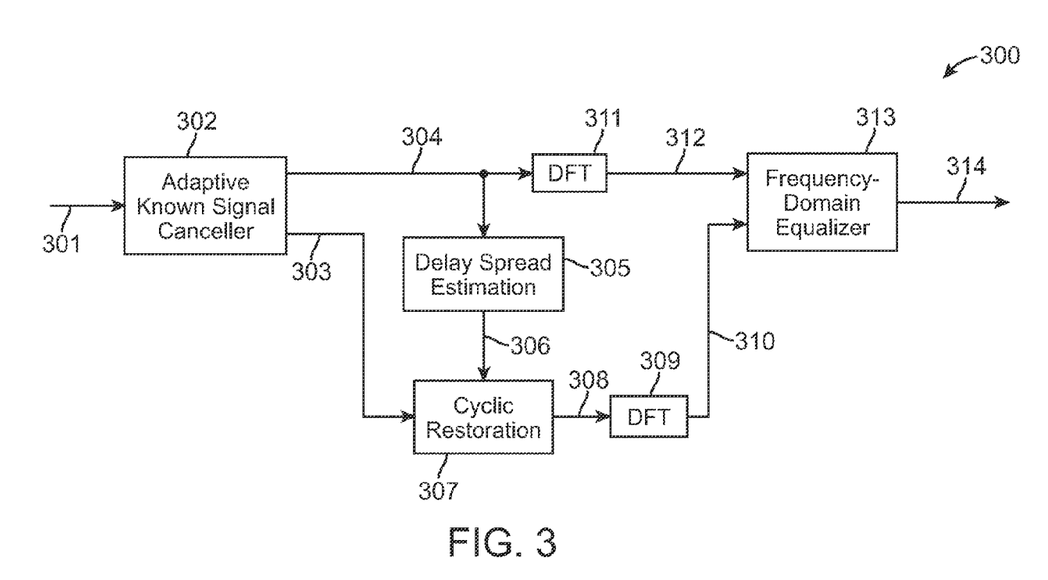
FIG. 3 shows an orthogonal frequency domain modulation (OFDM) receiver with an adaptive known signal canceller 302.

FIG. 3 shows an orthogonal frequency domain modulation (OFDM) receiver with an adaptive known signal canceller 302. OFDM receiver 300 is shown to include input signal 301, adaptive known signal canceller 302, time domain unknown signal 303, estimated channel impulse response 304, delay spread estimation block 305, estimated delay spread 306, cyclic restoration block 307, cyclically restored signal (or cyclically restored time domain unknown signal) 308, discrete Fourier transformer (DFT) 309, frequency domain unknown signal 310, DFT 311, estimated frequency response signal 312, frequency domain equalizer 313, and equalized signal 314.

Receiver 300 receives input signal 301, which is analogous to input signal 101 or input signal 201. Adaptive known signal canceller 302 of receiver 300 is advantageously configured to remove the known portion of the input signal 301 and generate a time domain unknown signal 303, analogous to output signals 103 or 203, along with an estimated channel impulse response 304. Receiver 300 uses a multi-carrier (OFDM) signal.

A delay spread estimation block 305 is operative to receive the estimated channel impulse response 304, and further operative to generate an estimated delay spread 306.

Adaptive known signal canceller 302 is connected to cyclic restoration block 307, DFT 311, and delay spread estimation block 305. Adaptive known signal canceller 302 receives input signal 301, and is operative to generate estimated channel impulse response 304, and time domain unknown signal 303. Adaptive known signal canceller 302 is analogous to canceller 100 or 200 in FIG. 1 or FIG. 2 respectively.

A delay spread estimation block 305 is connected to cyclic restoration block 306, DFT 311, and canceller 302. Delay spread estimation block 305 is operative to receive the estimated channel impulse response 304, and to generate an estimated delay spread 306. In one embodiment of the present invention, the delay spread estimation block 305 estimates the delay spread 306 by finding the earliest and latest taps (coefficients) of the estimated channel impulse response 304 that are above a threshold, and thereafter measuring the distance between the two. Cyclic restoration block 307 is shown connected to canceller 302, delay spread estimation block 305, and DFT 309. Cyclic restoration block 307 is operative to receive signal 303 and the estimated delay spread 306, and to generate a cyclically restored signal 308. The process of cyclic restoration is well known to one skilled in the art, and is the process of adding a portion of a signal to a delayed portion of a signal to form a single frame that represents a cyclic convolution of the signal frame with the channel impulse response, wherein the length of the signal portions added together correspond to the estimated delay spread of the channel.

FIG. 3 further shows a first DFT 309 connected to cyclic restoration block 307 and frequency domain equalizer block 313. DFT 309 is operative to receive the cyclically restored signal 308 and generate frequency domain unknown signal 310, comprised of sub-signals for each of the orthogonal sub-carriers. The frequency domain unknown signal 310 is a frequency representation of the cyclically restored signal 308.

A second DFT 311 is shown connected to canceller 302, delay spread estimation block 305, and frequency domain equalizer 313. DFT 311 is operative to receive the estimated channel impulse response 304 and generate an estimated frequency response signal 312. The estimated frequency response signal 312 is a frequency representation of the estimated channel impulse response 304. In the embodiment of the present invention shown in FIG. 3, DFT 311 and delay spread estimation block 305 only share the same input, and are not coupled to each other.

In an alternative embodiment of the present invention, DFT 311 is coupled to delay spread estimation block 305 and operative to reduce the noise from parts of the estimated channel impulse response 304 outside the estimated delay spread 306.

In one embodiment, only the estimated channel impulse response 304 within the estimated delay spread 306 is used by DFT 311. Parts of the estimated channel impulse response 304 outside the estimated delay spread 306 are not used, or are effectively set to zero by DFT 311, resulting in a truncated impulse response. Lastly, a frequency domain equalizer (FEQ) 313 is shown connected to both DFT 311 and DFT 309. FEQ 313 is operative to receive the estimated frequency response 312 and generate an equalized signal 314. Equalized signal 314 is a frequency domain representation of the unknown part of the received input signal 301, with the effects of the communication channel removed. The equalized signal 314 is the receiver's estimate of the unknown portion of the transmitted signal.

Adaptive known signal cancellers 100 and 200 can also be applied to non-OFDM signals, such as those employing single-carrier modulation. In that case, equalization can be done in either the time domain or frequency domain. In an exemplary embodiment of the present invention, an inverse DFT (IDFT) block is connected to the FEQ 313 to convert the equalized signal back to time domain for further processing.

Figure 4:
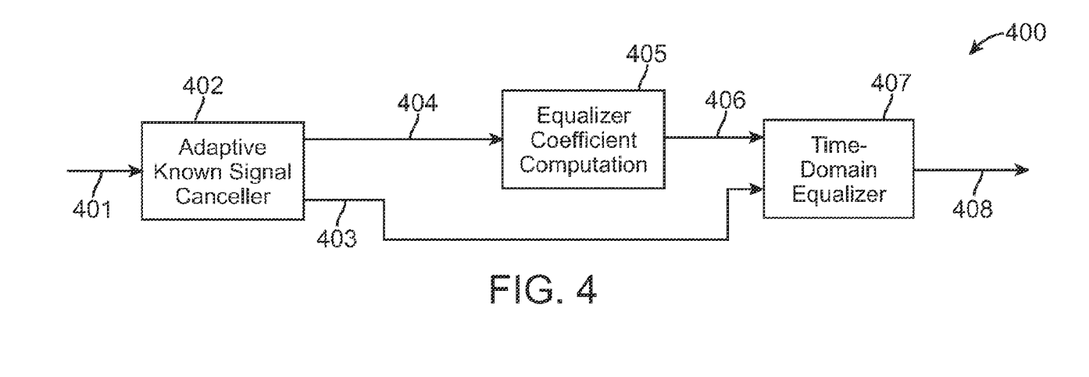
FIG. 4 shows a receiver 400 in which the estimated channel impulse response 404 is used to compute time-domain equalizer coefficients.

FIG. 4 shows a receiver 400 in which the estimated channel impulse response 404 is used to compute time-domain equalizer coefficients. FIG. 4 is shown to include receiver 400, input signal 401, adaptive known signal canceller 402, output signal 403, estimated channel impulse response 404, equalizer coefficient computation block 405, time domain equalizer coefficients 406, time domain equalizer block 407, and equalized signal 408. The receiver 400 uses a single carrier signal.

An adaptive known signal canceller 402 is operative to receive input signal 401, and further operative to remove the known portion of the input signal 401 and generate an output signal 403, along with an estimated channel impulse response 404. Canceller 402 is connected to equalizer coefficient computation block 405 and time domain equalizer block 407. Equalizer coefficient computation block 405 is connected to canceller 402 and time domain equalizer block 407. Equalizer coefficient computation block 405 is operative to receive estimated channel impulse response 404 and further operative to compute and generate time domain equalizer coefficients 406 based on the estimated channel impulse response 404.

Multiple ways to calculate time domain equalizer coefficients are known to one skilled in the art depending on the structure of the equalizer and the algorithms employed. In one embodiment of the present invention coefficients are generated according to a minimum mean squared error (MMSE) criterion, where equations are set up to minimize the mean squared error between equalizer outputs and the transmitted symbols given the channel impulse response and an estimate of the signal to noise ration (SNR). Then the equations are solved for the equalizer. It is noted that other coefficient generating methods are known to those skilled in the art.

Techniques to compute equalizer coefficients from a channel impulse response are well-known in the art. A time domain equalizer block 407 is operative to apply the equalizer coefficients 406 to the output signal 403 to generate an equalized signal 408. Time domain equalizer block 407 is connected to equalizer coefficient computation block 405 and adaptive known signal canceller 402. The time domain equalizer 407 may take the form of a linear equalizer, a decision feedback equalizer (DFE), or in general any type of equalizer used in the art of digital communication system design.

Figure 5:
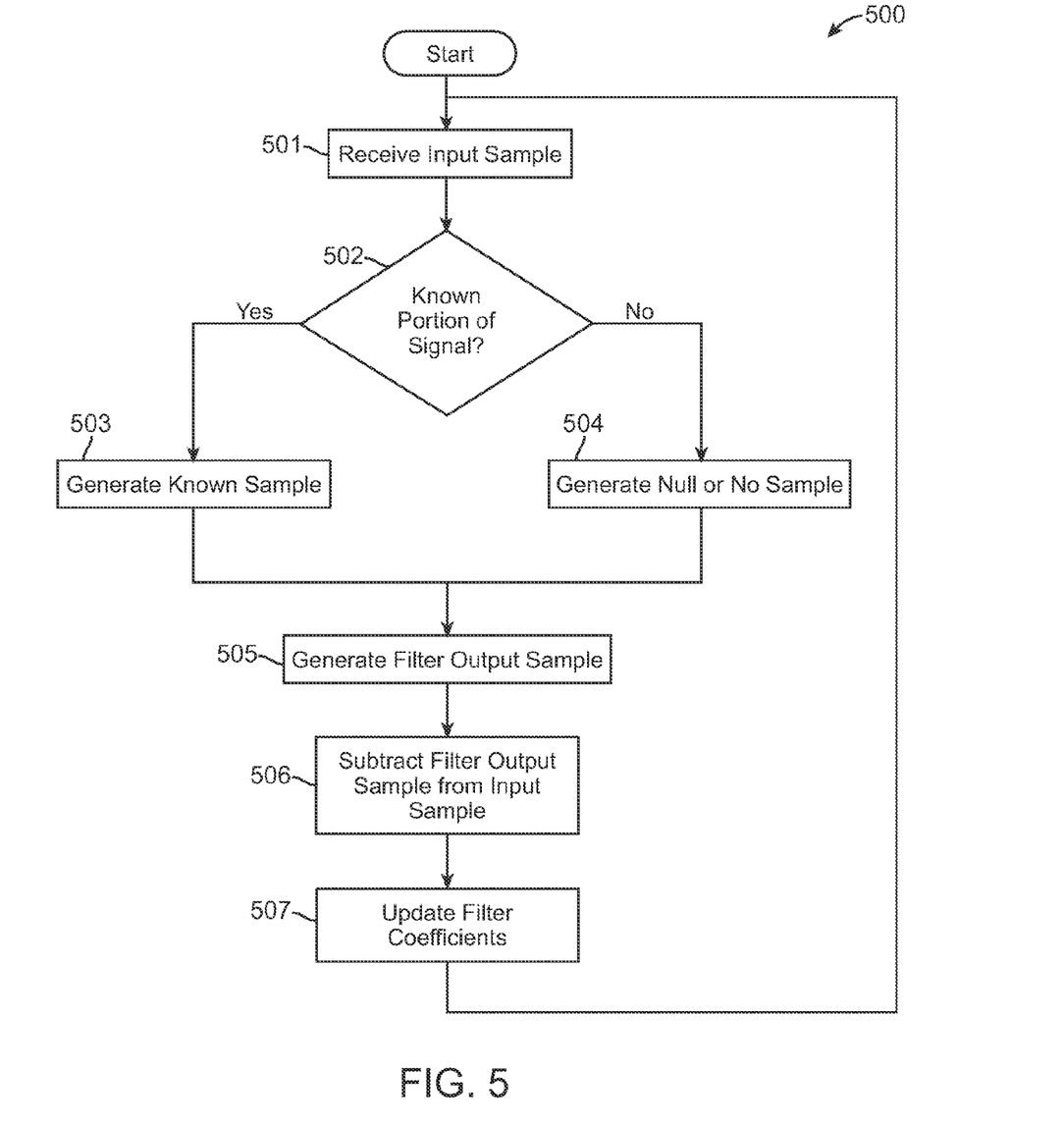
FIG. 5 shows a known signal cancellation and channel impulse response estimation process 500.

FIG. 5 shows a known signal cancellation and channel impulse response estimation process 500 in accordance with a method of the present invention. At step 501, a sample of an input signal (such as the input signals 101, 201, 301 or 401) is received. At step 502, a determination is made whether or not the input sample corresponds to a known portion of the signal. If yes, and the sample does correspond to a known portion of the signal, a sample of the known portion of the signal is generated at step 503. Otherwise, if no, a null sample or no sample is generated at step 504. The combination of known samples and null or no samples is analogous to the known signals 103, and 203. At step 505 a sample of the filtered known signal is generated. The filtered known signal is analogous to filtered known signals 105 and 205. At step 506, the sample of the filtered known signal is subtracted from the sample of the input signal to produce a sample of the output signal. The output signal is analogous to the signals 107, 207, 303, and 403. At step 507, the filter coefficients of the known signal canceller filter block (such as blocks 104 or 204) are updated based on the difference between the output signal and the desired signal. The desired signal is analogous to the desired signals 109 and 209. The coefficients of the known signal canceller filter block correspond to the estimated channel impulse response. Next, the process proceeds to step 501, where another sample of the input signal is received. The process is performed in a continuous manner as long as the input signal is being received.

The hardware described above, including any logic or transistor circuit, may be generated automatically by computer based on a description of the hardware expressed in the syntax and the semantics of a hardware description language, as known by those skilled in the art. Applicable hardware description languages include those provided at the layout, circuit netlist, register transfer, and schematic capture levels. Examples of hardware description languages include GDS II and OASIS (layout level), various SPICE languages and IBIS (circuit netlist level), Verilog and VHDL (register transfer level) and Virtuoso custom design language and Design Architecture-IC custom design language (schematic capture level). The hardware description may also be used, for example, in various behavior, logic and circuit modeling and simulation purposes.

Although the present invention has been described in terms of specific embodiments, it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A receiver responsive to at least one input signal of a communication channel and operative to generate an equalized signal comprising:
an adaptive known signal canceller responsive to an input signal of a communication channel including frames of information, said input signal including orthogonal sub-carriers and representing a transmitted signal that has been distorted by the communication channel, said adaptive known signal canceller operative to generate a time domain unknown signal, and further operative to generate an estimated channel impulse response signal representing substantially the impulse response of the channel, the adaptive known signal canceller including a known signal canceller filter configured to generate a filtered known signal, the known signal canceller filter configured to receive a coefficient update signal that is used to update the coefficient, the adaptive known signal canceller further including a subtractor responsive to the input signal and operative to generate an output signal, the subtractor configured to subtract the filtered known signal from the input signal, the adaptive known signal canceller further including a known signal canceller update unit responsive to a desired signal, the desired signal representing the desired output signal with the known signal part having been removed, the known signal canceller update unit operative to provide the coefficient update signal to the known signal canceller filter based on the difference between the output signal and the desired signal, so that the coefficients correspond to an estimate of the impulse response of the channel, and a known portion of the transmitted signal is adaptively removed from the input signal; and
a frequency domain equalizer responsive to a frequency representation of the estimated channel impulse response and a frequency representation of a cyclically restored time domain unknown signal and operative to generate an frequency domain equalized signal, the frequency domain equalizer configured to remove the effects of the channel thereby generating a frequency domain estimate of the unknown part of the transmitted signal.

2. A receiver as recited in claim 1, further comprising:
a delay spread estimation block responsive to an estimated channel impulse response and operative to generate an estimated delay spread signal,
a cyclic restoration block responsive to the output signal and operative to generate a cyclically restored signal, the cyclic restoration block configured to add a portion of the output signal to a delayed portion of the output signal to form a single frame that represents a cyclic convolution of the single frame with the channel impulse response;
a first discrete Fourier transformer (DFT) responsive to the cyclically restored time domain unknown signal and operative to generate frequency domain sub-signals for each of the orthogonal sub-carriers, the DFT configured to use Fourier analysis to transform the cyclically restored time domain unknown signal into frequency domain sub-signals for each of the orthogonal sub-carriers; and
a second DFT responsive to the estimated channel impulse response and operative to generate an estimated frequency response signal, which is the frequency representation of the estimated channel impulse response, the second DFT configured to use Fourier analysis to transform the estimated channel impulse response into the estimated frequency response signal.

3. A receiver as recited in claim 2, wherein the delay spread estimation block is configured to generate an estimated delay spread signal by finding the earliest and latest coefficients of the estimated channel impulse response that are above a threshold, and thereafter measuring the distance between the earliest and latest coefficients.

4. A receiver responsive to at least one input signal and operative to generate an equalized signal comprising:
an adaptive known signal canceller responsive to an input signal of a communication channel including frames of information, said input signal representing a transmitted signal that has been distorted by the communication channel, said adaptive known signal canceller operative to generate a time domain unknown signal, and further operative to generate an estimated channel impulse response signal representing substantially the impulse response of the channel, the adaptive known signal canceller including a known signal canceller filter configured to generate a filtered known signal, the known signal canceller filter configured to receive a coefficient update signal that is used to update the coefficients, the adaptive known signal canceller further including a subtractor responsive to the input signal and operative to generate an output signal, the subtractor configured to subtract the filtered known signal from the input signal, the adaptive known signal canceller further including a known signal canceller update unit responsive to a desired signal, the desired signal representing the desired output signal with the known signal part having been removed, the known signal canceller update unit operative to provide the coefficient update signal to the known signal canceller filter based on the difference between the output signal and the desired signal, so that the coefficients correspond to an estimate of the impulse response of the channel, and a known portion of the transmitted signal is adaptively removed from the input signal;
an equalizer coefficient computation block responsive to the estimated channel impulse response and operative to compute and generate time domain equalizer coefficients; and
a time domain equalizer responsive to the time domain equalizer coefficients and to the output signal, and operative to generate an equalized signal, the time domain equalizer configured to filter the output signal using the time domain equalizer coefficients to yield an equalized signal.

5. A receiver as recited in claim 4, wherein the equalizer coefficient computation block generates the coefficients according to minimum mean squared error (MMSE) criterion, wherein equations are set up to minimize the mean squared error between equalizer outputs and transmitted symbols given the channel impulse response and an estimate of the signal to noise ratio (SNR), and further wherein the equations are solved for the equalizer coefficients.

6. An adaptive known signal canceller adaptive for use in a receiver configured to receive at least one channel carrying information, said adaptive known canceller comprising:
a known signal canceller filter responsive to a known signal including a known portion of a transmitted signal, the known signal canceller filter operative to generate a filtered known signal;

a subtractor unit responsive to an input signal and operative to generate an output signal, the subtractor unit configured to subtract the filtered known signal from the input signal to generate an output signal, such that the known portion of the transmitted signal is substantially removed from the input signal; and a known signal canceller update unit, responsive to a desired signal and an output signal and operative to adjust the coefficients of the known signal canceller filter based on the difference between the output signal and the desired signal, so that the filter coefficients substantially reflect the impulse response of a channel.

7. An adaptive known signal canceller as recited in claim 6, wherein the desired signal is an all-zero signal.

8. An adaptive known signal canceller as recited in claim 6, wherein the desired signal is a null signal.

9. An adaptive known signal canceller as recited in claim 6, wherein the adaptive known signal canceller is operative to perform channel estimation and to provide an output signal in response to an input signal and a known signal.

10. An adaptive known signal canceller as recited in claim 6, further comprising a known signal generator, operative to generate a known signal including a known portion of a transmitted signal.

11. An adaptive known signal canceller as recited in claim 6, further comprising a signal subtractor, responsive to the input signal and the filtered known signal, and operative to compute the difference between the input signal and the filtered known signal to generate an output signal.

12. An adaptive known signal canceller, as recited in claim 6, wherein the known signal includes a quasi-cyclic pseudorandom number (PN) sequence.

13. An adaptive known signal canceller, as recited in claim 6, wherein the known signal includes a non-cyclic pseudorandom (PN) sequence.

14. An adaptive known signal canceller as recited in claim 6, wherein said known signal generator is further operative to stop generating signals during a time corresponding to an unknown portion of a transmitted signal.

15. An adaptive known signal canceller as recited in claim 6, wherein the known signal canceller update unit adjusts the filter coefficients using the LMS algorithm.

16. An adaptive known signal canceller as recited in claim 6, wherein the desired signal consists of a discrete time signal whose values are all zero.

17. An adaptive known signal canceller as recited in claim 6, wherein the known portion of the transmit signal is a frame header.

18. The adaptive known signal canceller as recited in claim 17, wherein the frame header consists of a PN sequence.

19. The adaptive known signal canceller as recited in claim 6, wherein the known signal canceller filter is a finite impulse response filter.

20. The adaptive known signal canceller as recited in claim 19, wherein the known signal canceller filter includes only addition and subtraction elements.

21. An adaptive known signal canceller operative to perform channel estimation and to provide an output signal in response to an input signal, comprising:

a known signal generator, operative to generate a known signal consisting of a known portion of a transmitted signal;

a known signal canceller filter, responsive to the known signal and operative to generate a filtered known signal;

a signal subtractor, responsive to an input signal and the filtered known signal, and operative to compute the difference between the input signal and the filtered known signal to generate an output signal; and a known signal canceller update unit, responsive to a desired signal and an output signal, and operative to continually adjust the coefficients of the known signal canceller filter based on the difference between the output signal and a desired signal, to generate an estimated channel impulse response.

22. An adaptive known signal canceller as recited in claim 21, wherein said known signal generator is operative to generate a null signal corresponding to an unknown portion of a transmitted signal.

23. An adaptive known signal canceller as recited in claim 21, wherein the null signal consists of a discrete time signal whose values are all zero.

24. An adaptive known signal canceller as recited in claim 21, wherein said known signal generator is further operative to stop generating signals during a time corresponding to an unknown portion of a transmitted signal.

25. An adaptive known signal canceller as recited in claim 21, wherein the known signal canceller update unit adjusts the filter coefficients using the LMS algorithm.

26. An adaptive known signal canceller as recited in claim 21, wherein the desired signal consists of a discrete time signal whose values are all zero.

27. An adaptive known signal canceller as recited in claim 21, wherein the known portion of the transmit signal is a frame header.

28. The adaptive known signal canceller as recited in claim 27, wherein the frame header consists of a PN sequence.

29. The adaptive known signal canceller as recited in claim 21, wherein the known signal canceller filter is a finite impulse response filter.

30. The adaptive known signal canceller as recited in claim 29, wherein the known signal canceller filter includes only addition and subtraction elements.

31. The adaptive known signal canceller as recited in claim 29, wherein the finite impulse response filter consists of a plurality of segments, wherein each segment is responsive to a delayed sample of the known signal, and wherein the finite impulse response filter further consists of a filter block for filtering the delayed samples by using coefficients which are updated based on a step size generated for each segment.

32. An adaptive known signal canceller operative to provide an output signal in response to a input signal, comprising:

a known signal generator, operative to generate a known signal consisting of a known portion of a transmitted signal;

a known signal canceller filter, responsive to the known signal and operative to generate a filtered known signal;

a carrier rotation block, responsive to an input signal and operative to generate a rotated signal, wherein said rotated signal represents the input signal with a carrier phase rotation;

a signal subtractor, responsive to the rotated signal and the filtered known signal, and operative to compute the difference between the rotated signal and the filtered known signal to generate an output signal;

a known signal canceller update unit, responsive to a desired signal and an output signal, and operative to adjust the coefficients of the known signal canceller filter based on the difference between the output signal and a desired signal, to generate an estimated channel impulse response; and a phase error detection block, responsive to the rotated signal and the filtered known signal, and operative to generate a phase error signal;

wherein the carrier rotation block is further operative to use said phase error signal to update the phase rotation for a subsequent value of the input signal.

33. An adaptive known signal canceller as recited in claim 32, wherein the known signal generator is further operative to generate a null signal corresponding to an unknown portion of a transmitted signal.

34. An adaptive known signal canceller as recited in claim 32, wherein the null signal consists of a discrete time signal whose values are all zero.

35. An adaptive known signal canceller as recited in claim 32, wherein the known signal generator is further operative to stop generating signals during a time corresponding to an unknown portion of a transmitted signal.

36. An adaptive known signal canceller as recited in claim 32, wherein the known signal canceller update unit adjusts the filter coefficients using the LMS algorithm.

37. An adaptive known signal canceller as recited in claim 32, wherein the desired signal consists of a discrete time signal whose values are all zero.

38. An adaptive known signal canceller as recited in claim 32, wherein the known portion of the transmit signal is a frame header.

39. An adaptive known signal canceller as recited in claim 38, wherein the frame header consists of a PN sequence.

40. An adaptive known signal canceller as recited in claim 32, wherein the known signal consists of a sequence of values in the set $\{-1, +1\}$.

41. An adaptive known signal canceller of claim 32, wherein the known signal canceller filter is a finite impulse response filter.

42. An adaptive known signal canceller of claim 41, wherein the known signal canceller filter is implemented using only addition and subtraction.

43. An adaptive known signal canceller of claim 42, wherein the finite impulse response filter consists of a plurality of segments, wherein each segment is responsive to a delayed sample of the known signal, and wherein the finite impulse response filter further consists of a filter block for filtering the delayed samples by using coefficients which are updated based on a step size generated for each segment.

44. An adaptive known signal canceller comprising:
means for generating a known signal consisting of a known portion of a transmitted signal;
means for receiving the known signal;
means for generating a filtered known signal;
means for receiving an input signal and the filtered known signal;
means for computing the difference between the input signal and the filtered signal to generate an output signal
means for receiving a desired signal and an output signal;
means for adjusting the coefficients of the known signal canceller filter based on the difference between the output signal and a desired signal, to generate an estimated channel impulse response.

45. A method of channel impulse response estimation comprising:
a. receiving an input signal sample;
b. determining if said sample corresponds to a known portion of the signal, and if it does, generating a sample of the known portion of the signal;
c. generating a filtered known sample using one or more samples of the known portion of the signal;

d. generating an output sample by subtracting the sample of the filtered known signal from the sample of the input signal;
e. updating the filter coefficients of the known signal canceller filter block based on the difference between the output signal and a desired signal; and
f. repeating steps a.-e. so long as the input signal is received.

46. A non-transitory computer-readable medium containing a description expressed in a hardware description language which is interpreted by a computer to specify a circuit that performs a method to generate an equalized signal comprising:
an adaptive known signal canceller responsive to an input signal of a communication channel including frames of infoiiiiation, said input signal including orthogonal subcarriers and representing a transmitted signal that has been distorted by the communication channel, said adaptive known signal canceller operative to generate a time domain unknown signal, and further operative to generate an estimated channel impulse response signal representing substantially the impulse response of the channel, the adaptive known signal canceller including a known signal canceller filter configured to generate a filtered known signal, the known signal canceller filter configured to receive a coefficient update signal that is used to update the coefficient, the adaptive known signal canceller further including a subtractor responsive to the input signal and operative to generate an output signal, the subtractor configured to subtract the filtered known signal from the input signal, the adaptive known signal canceller further including a known signal canceller update unit responsive to a desired signal, the desired signal representing the desired output signal with the known signal part having been removed, the known signal canceller update unit operative to provide the coefficient update signal to the known signal canceller filter based on the difference between the output signal and the desired signal, so that the coefficients correspond to an estimate of the impulse response of the channel, and a known portion of the transmitted signal is adaptively removed from the input signal; and
a frequency domain equalizer responsive to a frequency representation of the estimated channel impulse response and a frequency representation of a cyclically restored time domain unknown signal and operative to generate an frequency domain equalized signal, the frequency domain equalizer configured to remove the effects of the channel thereby generating a frequency domain estimate of the unknown part of the transmitted signal.

47. A non-transitory computer-readable medium containing a description expressed in a hardware description language which is interpreted by a computer to specify a circuit that performs a method of channel impulse response estimation comprising:
an adaptive known signal canceller responsive to an input signal of a communication channel including frames of information, said input signal representing a transmitted signal that has been distorted by the communication channel, said adaptive known signal canceller operative to generate a time domain unknown signal, and further operative to generate an estimated channel impulse response signal representing substantially the impulse response of the channel, the adaptive known signal canceller including a known signal canceller filter configured to generate a filtered known signal, the known signal canceller filter configured to receive a coefficient update signal that is used to update the coefficients, the adaptive known signal canceller further including a subtractor responsive to the input signal and operative to generate an output signal, the subtractor configured to subtract the filtered known signal from the input signal, the adaptive known signal canceller further including a known signal canceller update unit responsive to a desired signal, the desired signal representing the desired output signal with the known signal part having been removed, the known signal canceller update unit operative to provide the coefficient update signal to the known signal canceller filter based on the difference between the output signal and the desired signal, so that the coefficients correspond to an estimate of the impulse response of the channel, and a known portion of the transmitted signal is adaptively removed from the input signal;

a equalizer coefficient computation block responsive to the estimated channel impulse response and operative to compute and generate time domain equalizer coefficients; and a time domain equalizer responsive to the time domain equalizer coefficients and to the output signal, and operative to generate an equalized signal, the time domain equalizer configured to filter the output signal using the time domain equalizer coefficients to yield an equalized signal.

48. A non-transitory computer-readable medium containing a description expressed in a hardware description language which is interpreted by a computer to specify a circuit that performs a method to receive at least one channel carrying information, said circuit comprising:

a known signal canceller filter responsive to a known signal including a known portion of a transmitted signal, the known signal canceller filter operative to generate a filtered known signal;

a subtractor unit responsive to an input signal and operative to generate an output signal, the subtractor unit configured to subtract the filtered known signal from the input signal to generate an output signal, such that the known portion of the transmitted signal is substantially removed from the input signal; and a known signal canceller update unit, responsive to a desired signal and an output signal and operative to adjust the coefficients of the known signal canceller filter based on the difference between the output signal and the desired signal, so that the filter coefficients substantially reflect the impulse response of a channel.

* * * * *

UNITED STATES PATENT AND TRADEMARK OFFICE
CERTIFICATE OF CORRECTION

PATENT NO.        : 8,135,058 B2
APPLICATION NO.   : 12/249814
DATED             : March 13, 2012
INVENTOR(S)       : Jordan C. Cookman et al.

It is certified that error appears in the above-identified patent and that said Letters Patent is hereby corrected as shown below:

Column 18, Claim 46, Line 16, delete the portion of text reading "infoiiiiation" and replace with --information--.

Signed and Sealed this
Twenty-fourth Day of April, 2012

David J. Kappos
*Director of the United States Patent and Trademark Office*